Patented Mar. 27, 1923.

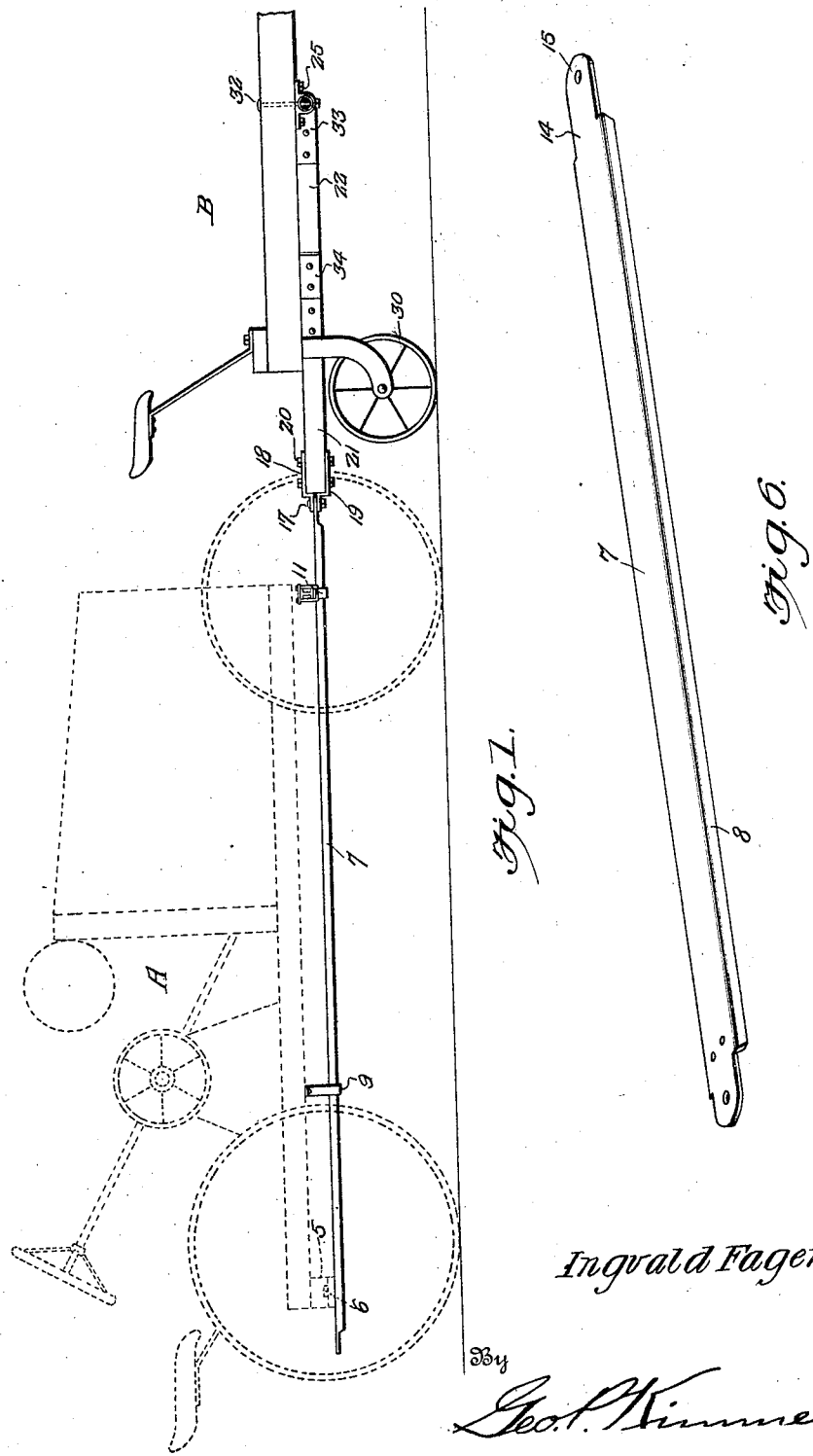

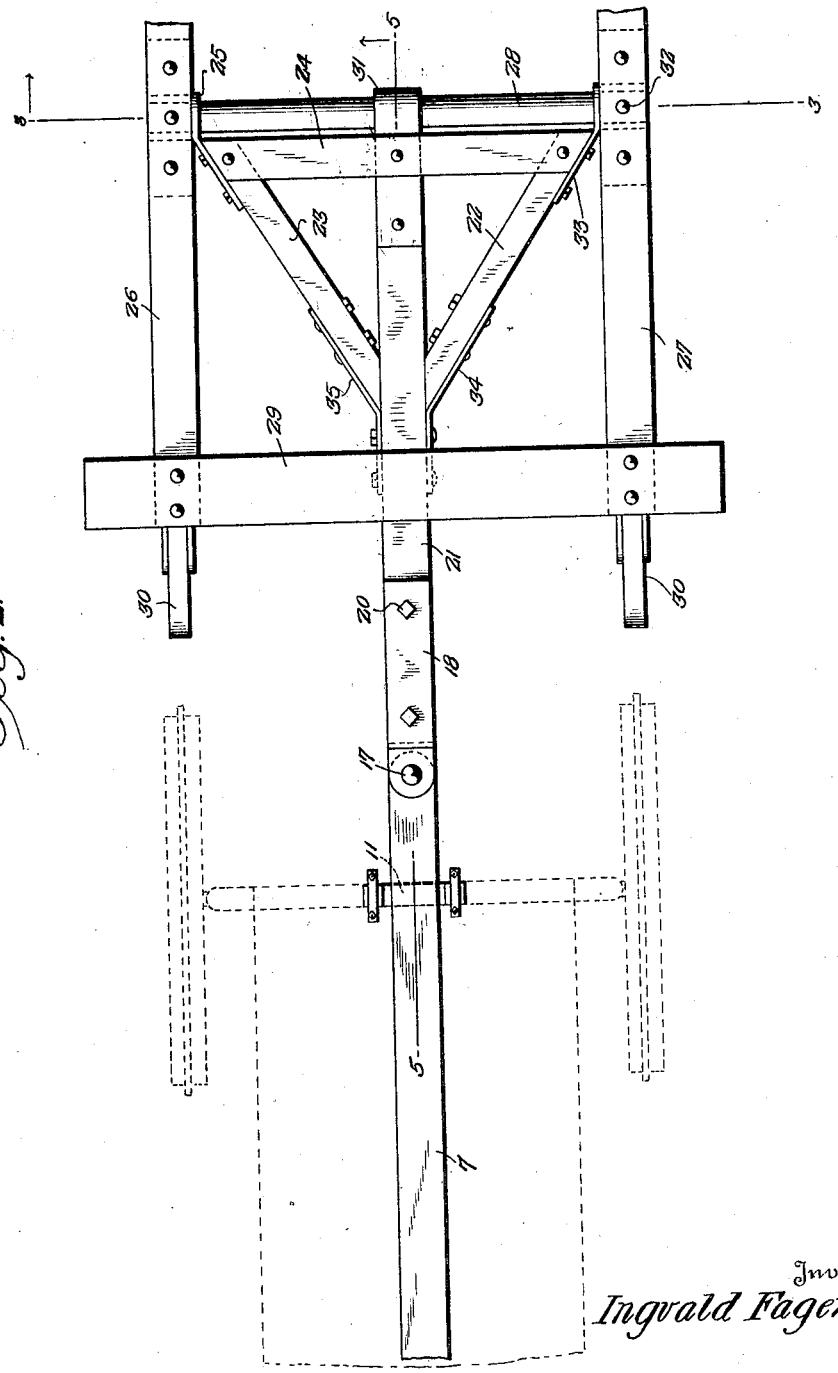

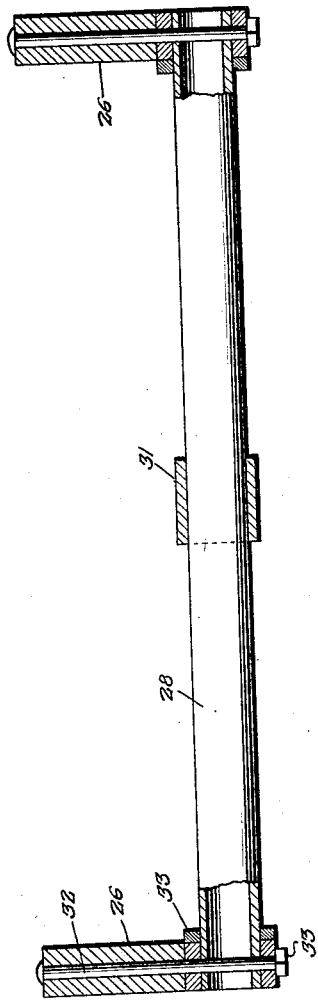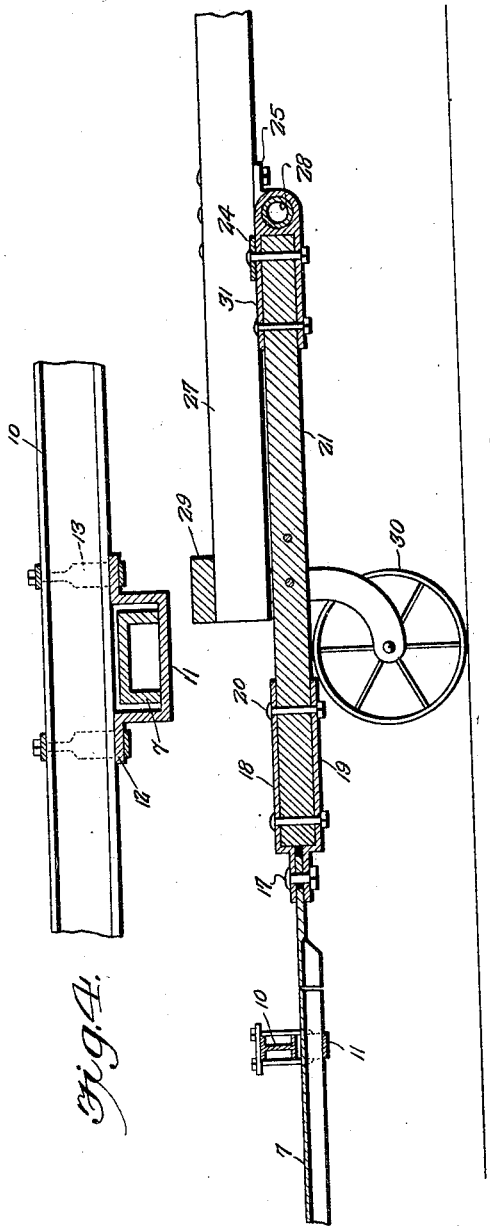

1,450,068

UNITED STATES PATENT OFFICE.

INGVALD FAGERSKOG, OF SACRAMENTO, CALIFORNIA.

DRIVE COUPLING.

Application filed March 25, 1921. Serial No. 455,556.

*To all whom it may concern:*

Be it known that I, INGVALD FAGERSKOG, a citizen of the United States, residing at Sacramento, in the county of Sacramento and State of California, have invented certain new and useful Improvements in Drive Couplings, of which the following is a specification.

This invention relates to a drive coupling for agricultural implements and more particularly to that class of devices for attachment to a tractor whereby propelling power may be directly applied to the implement rearwardly thereof while in a field.

The primary object of the invention resides in the provision of a drive coupling for the purpose of applying power to a sweep rake and stacker, buck rake, or a grain header adapted to be attached forwardly of and directly to a tractor whereby propelling power may be obtained and thus dispensing with animal power.

Another and equally important object of the invention will be found to consist in the provision of a drive coupling for attaching and propelling agricultural implements of various description forwardly of a tractor without affecting the free operation of said tractor or the implement and which can easily be attached and removed when so desired without particular skill or excessive labor.

An additional object of the invention consists in the construction of a drive coupling of the type above set forth which will be extremely simple, consisting of comparatively few parts inexpensive to manufacture, durable and rigid, highly efficient and practical in operation and use, capable of universal application in connection with various types of farming implements, practical and efficient and otherwise meeting the requirements of constructions of this character.

With these objects in view and others which will be suggested and manifest as the purpose and nature of my invention are revealed in the following specification and drawings wherein I have shown a preferred embodiment thereof, Figure 1 is a side view showing the invention as applied to a modern type of tractor, Fig. 2 is a plan view of the attachment, the front portion of the tractor being shown in dotted lines, Fig. 3 is a view partly in section taken on the line 3—3 of Fig. 2, Fig. 4 is a detail view of the reach front support, and, Fig. 5 is a sectional view taken on the line 5—5 of Fig. 2.

Fig. 6 is a detail view of the draw bar reach.

Referring now to the drawings wherein like parts designate similar parts throughout the specification, A designates a modern type of tractor which is shown as having a sweep rake stacker B connected forwardly thereof whereby power may be directly applied to the said stacker for propelling the same in the field as is well understood. The rear draw bar 5 of the tractor has bolted thereto as at 6 a longitudinally extending draw bar reach 7 preferably made of channel iron with its side flanges 8 projecting downwardly, said draw bar reach being supported by a hanger 9 secured to the frame of the tractor as clearly indicated by Fig. 1 of the drawing.

The said draw bar reach extends intermediate of the sides of the frame of the tractor and entirely beneath the same being held under the cross channel beam 10 of the front supporting axle of said tractor by a U-shaped strap or guide 11, the flanges 12 of which are secured in any well known manner by fastening elements 13 to the axle above referred to.

It will be observed that the reach bar 7 is loosely retained under said axle as clearly shown by Fig. 4 to allow for a certain amount of play due to rough ground being traversed, and preventing twisting of the said reach bar. The front end of the reach bar is provided with a thickened extension 14 which is provided with an aperture 15 to receive a vertical pivot pin or connection 17 whereby the reach bar is pivotally connected to a pair of metallic straps 18, 19, which are bolted as at 20 to the connecting pole or draft beam 21 carried beneath the sweep rake stacker.

The draft beam or pole 21 above referred to is preferably braced by a pair of diagonally extending members 22, 23 connected by a transverse cross beam 24, being provided at its respective sides with bearings 25 bolted to the underside of the parallel extending beams 26, 27 of the sweep rake stacker above referred to. The transverse shaft or pipe 28 supported in the bearings 25 forms a pivotal connection for the draft beam 21 and its bracing structure permitting freedom of movement of the stacker with respect to the tractor during its operation in a field when the same strikes obstructions for instance. The beams 26, 27 are in turn connected by a transverse cross beam 29, any suitable form of loosely mounted or pivotally connected ground supporting wheels 30 being provided for the sweep rake stacker to permit its easy operation when at work. It should be noted that the front terminal of the beam 21 is also provided with a strap 31 embracing the shaft or rod 28 above referred to, whereby a rigid yet pivotal connection is had between the tractor and the draft pole or beam 21 as is clearly understood, particularly from Fig. 2 of the drawing. The transverse shaft or member 28 is shown as bolted as at 32 and retained by fastening elements 33 to the side beams 26, 27 of the stacker and as such permits the diagonal side straps 33 to be secured to the respective brace members 22, 23 whereby the movable draft beam 21 may freely swing with respect to the stacker as above indicated.

The front terminals of the braces 22, 23 are also secured by side straps 34, 35 bolted to the member 21 whereby a firm and rigid structure capable of withstanding very rough use is afforded and which will not be easily broken or get out of order due to rough and constant use while in the field and subject to heavy loads.

From the above construction taken in connection with the drawing it will be seen that I have provided a novel and improved form of drive coupling for tractors whereby implements of various description may be connected to the front portion of a tractor to be directly driven thereby and which may easily be assembled and removed with facility and ease without material change of any of the parts and without excessive labor.

While I have referred to the attachment as connected to a sweep rake and stacker, it is to be understood that any other type of agricultural implement such as the common buck rake or grain header, may also be connected to the said tractor in the similar manner as above described and set forth. It will be readily understood that the reach bar 7 may be carried at all times beneath the body of the tractor without in any way affecting its operation when it is to be used in other agricultural work or when the same is being used alone. By this novel and improved form of attachment, the use of draft animals for such work which has heretofore been the common practice is entirely dispensed with, thus increasing the utility of the ordinary tractor now used in connection with all farm work. It will of course be apparent that the reach bar 7 may easily be secured to any of the common type of tractors now on the market and therefore the drive coupling or attachment is to be considered of universal application in connection with this type of farm machinery.

In the accompanying drawings, I have illustrated my invention embodied in one form by way of example, and which in practice has been found to be highly satisfactory in obtaining the desired results. It will be obvious however that other embodiments may be made and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

1. A drive coupling for connecting a tractor the part to be drawn by the tractor comprising a draw bar reach freely supported under the front axle of the tractor and extending forwardly thereof, a draft beam pivotally connected to the front terminal of the draw bar reach, a material-handling apparatus having a rigid transverse shaft connected to the front of said draft beam, and metallic straps carried by the draft beam for embracing the shaft to permit free vertical movement of a part to be drawn with respect to the draft beam.

2. The combination with a tractor, of a draw bar reach extending throughout the length of the tractor beneath the latter, and a draft beam provided with rigid angular brace bars connected thereto and pivotally attached to the forward terminal of the draw bar reach, a wheel supported material-handling apparatus having parallel side bars and a rigid transverse shaft beneath the side bars, and metallic straps connecting the draft beam and braces and freely movable on the shaft whereby free movement between the handling apparatus and the draft beam is effected when the apparatus is propelled.

In testimony whereof, I affix my signature hereto.

INGVALD FAGERSKOG.